(12) United States Patent
Weinrotter et al.

(10) Patent No.: US 8,761,212 B2
(45) Date of Patent: Jun. 24, 2014

(54) LASER DEVICE AND OPERATING METHOD FOR THE LASER DEVICE

(75) Inventors: Martin Weinrotter, Stuttgart-Botnang (DE); Pascal Woerner, Stuttgart (DE); Manfred Vogel, Ditzingen (DE); Juergen Raimann, Weil der Stadt (DE); Bernd Schmidtke, Leonberg (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1136 days.

(21) Appl. No.: 12/733,514

(22) PCT Filed: Jul. 8, 2008

(86) PCT No.: PCT/EP2008/058850
§ 371 (c)(1),
(2), (4) Date: Jun. 30, 2010

(87) PCT Pub. No.: WO2009/037016
PCT Pub. Date: Mar. 26, 2009

(65) Prior Publication Data
US 2011/0041793 A1 Feb. 24, 2011

(30) Foreign Application Priority Data
Sep. 14, 2007 (DE) .......................... 10 2007 043 915

(51) Int. Cl.
*H01S 3/11* (2006.01)

(52) U.S. Cl.
USPC ........... 372/10; 372/6; 372/38.01; 372/38.06; 372/39; 372/43.01; 372/50.1; 372/70

(58) Field of Classification Search
CPC .......... H01S 3/06708; H01S 3/094023; H01S 3/10046; H01S 3/1022; H01S 3/1024; H01S 3/11; H01S 3/1112; H01S 5/005; H01S 5/026
USPC ............... 372/6, 10, 38.01, 38.06, 39, 43.01, 372/50.1, 70
See application file for complete search history.

(56) References Cited

U.S. PATENT DOCUMENTS

| 5,019,769 | A | * | 5/1991 | Levinson ........................ 372/31 |
| 5,151,909 | A | | 9/1992 | Davenport et al. |
| 5,287,379 | A | | 2/1994 | Ohzu et al. |
| 6,382,957 | B1 | * | 5/2002 | Early et al. ......................... 431/1 |
| 6,456,634 | B1 | * | 9/2002 | Cremer ....................... 372/29.01 |
| 2002/0097482 | A1 | * | 7/2002 | Sasaoka et al. ............... 359/334 |
| 2010/0000485 | A1 | * | 1/2010 | Vogel et al. ............... 123/143 B |

FOREIGN PATENT DOCUMENTS

| DE | 4317863 | A1 | * | 12/1994 | ............. H04B 10/08 |
| EP | 0 918 383 | | | 5/1999 | |
| JP | 5-248989 | | | 9/1993 | |

(Continued)

*Primary Examiner* — Yuanda Zhang
(74) *Attorney, Agent, or Firm* — Kenyon & Kenyon LLP

(57) ABSTRACT

A method for operating a laser device, which has a laser-active solid-state body including a preferably passive Q switch, in which pumped light is applied to the laser device in order to generate a laser pulse. The laser device and/or an optical link between the laser device and a pumped light source supplying the pumped light is at least partially acted upon by an optical test pulse in order to check the integrity of a/the optical link between the laser device and a pumped light source supplying the pumped light.

14 Claims, 4 Drawing Sheets

(56) References Cited

FOREIGN PATENT DOCUMENTS

| JP | 2002-344072 | 11/2002 |
| JP | 2003-264329 | 9/2003 |
| JP | 2006-242039 | 9/2006 |
| WO | WO 2005/066488 | 7/2005 |
| WO | WO 2006/125685 | 11/2006 |
| WO | WO 2006125685 A1 * | 11/2006 ............... H01S 3/11 |

* cited by examiner

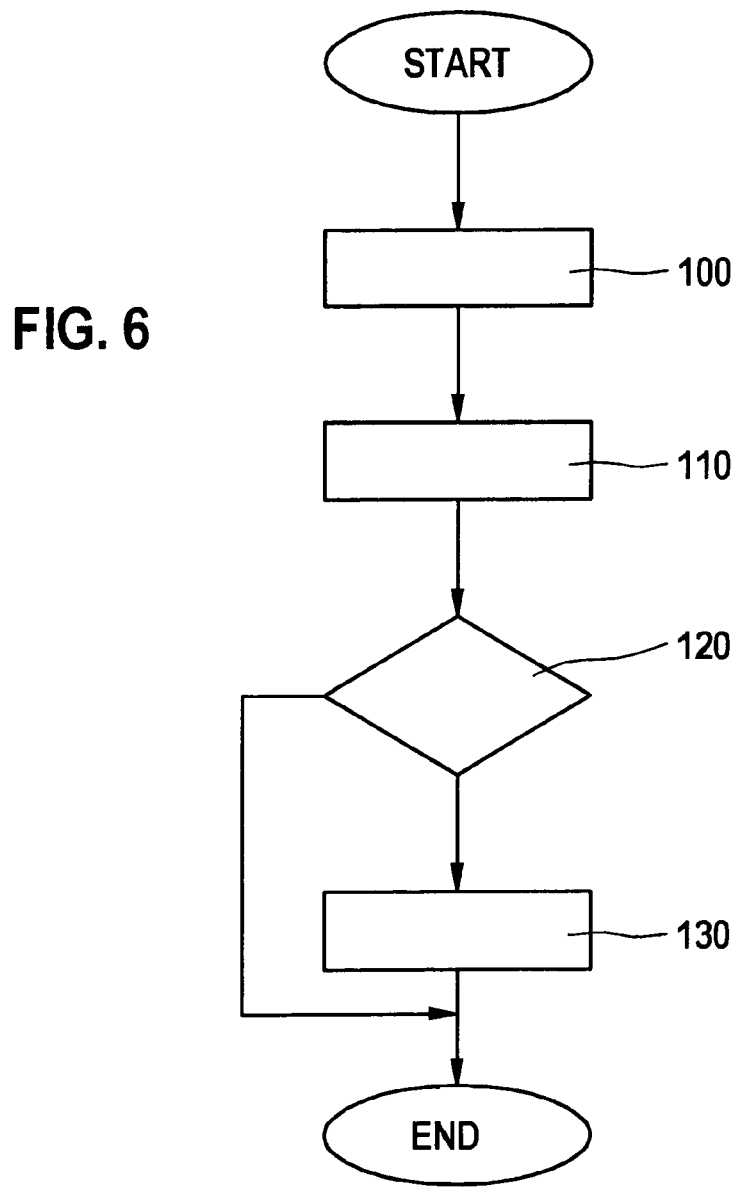

LASER DEVICE AND OPERATING METHOD FOR THE LASER DEVICE

BACKGROUND OF THE INVENTION

Field of the Invention

The present invention relates to a method for operating a laser device, which includes a laser-active solid-state body having a preferably passive Q-switch, in which pumped light is applied to the laser device in order to generate a laser pulse.

In addition, the present invention relates to a laser device having a laser-active solid-state body including a Q-switch, preferably a passive Q-switch, and having an optical link, in particular one including a light-guide device, via which pumped light generated by a pumped light source is able to be conducted to the laser device for the generation of a laser pulse.

SUMMARY OF THE INVENTION

It is the object of the present invention to improve a laser device and an operating method of the type mentioned in the introduction, in such a way that higher safety is provided while the laser device is in operation and that faults are able to be detected in an uncomplicated manner.

In an operating method of the type mentioned in the introduction, this object of the present invention is achieved in that the laser device and/or an optical link between the laser device and a pumped light source providing the pumped light is at least partially acted upon by a test pulse, in particular an optical test pulse, in order to check the integrity of an optical link/the optical link between the laser device and a pumped light source providing the pumped light.

Applying a special test pulse according to the present invention advantageously makes it possible to determine an operating state of the laser device even before pumped light having high radiation intensity is applied to the laser device in order to generate a laser pulse. Proper functioning of the laser device may be inferred by suitable evaluation of the reactions of the laser device in response to the application of the test pulse, which increases the operating safety and the personal safety.

In one specific embodiment of the operating method according to the present invention, it is especially advantageous that characteristic properties of the test pulse, in particular its pulse duration and/or amplitude and/or pulse energy are/is selected in a way that ensures that specifiable limit values are not exceeded. In an advantageous manner, the limit values according to the present invention are selected such that the test pulse will not pose any danger to persons who may be exposed to it, for example while servicing the laser device, the danger being the result of an interruption of an optical link between the pumped light source and the laser device.

The limit values able to be specified according to the present invention for the characteristic properties of the test pulse may advantageously be derived from limit values established by official or other recognized institutions. The specification of the test pulse according to the present invention advantageously ensures that for one, a check of the laser device is able to be performed using the test pulse, in particular prior to the radiation of pumped light pulses having high energy, and that in the event of an optical interruption or some other kind of damage to the laser device, for example, the test pulses used according to the present invention do not pose any danger to an environment and, more specifically, to persons present in the environment. When the specifiable limit values are selected appropriately, it is also possible to exclude the possibility that the test pulses cause damage to the source of the pumped light itself.

Another advantageous variant of the present invention provides a configuration that has an especially small design on account of the fact that the test pulse is generated by the pumped light source providing the pumped light. Especially in the case of a pumped light source that includes semiconductor laser diodes, a simple control of the afore-described characteristic properties of the test pulse, e.g., the amplitude, is advantageously provided by controlling the current supplied to the diode laser.

An exceptionally high operating safety of the laser device according to the present invention is provided in a further variant of the present invention in that the test pulses are emitted periodically, which therefore allows periodic checking of the laser device. In an especially advantageous manner, at least one test pulse according to the present invention is emitted prior to each generation of a regular laser pulse, and the functioning of the laser device is checked in this manner before pumped light having high energy is applied to the laser device in order to generate the regular laser pulses; such an application could completely destroy the laser device or also pose a danger to people in the event that the laser device shows existing damage. Destruction of the pumped light source is likewise able to be prevented in this manner.

In a further variant of the operating method according to the present invention, it is particularly advantageous that the test pulse is applied to the laser device and that the spontaneously emitted radiation produced in response to the test pulse is analyzed in the laser device. Applying the test pulse according to the present invention to the laser device advantageously results in a spontaneous emission known to one skilled in the art per se, which allows for a multitude of possible evaluations and corresponding inferences regarding the functioning of the laser device. For example, the present invention advantageously makes it possible to transmit the spontaneously emitted radiation produced in response to the test pulse via optical coupling means from the laser device to an evaluation device, which may include, in particular, a photo diode for converting the spontaneously emitted radiation into a corresponding electrical signal that is able to be evaluated using, for example, a control device of the laser device according to the present invention.

According to the present invention, the coupling means may in an especially advantageous manner be designed in such a way that they conduct, in particular reflect, the spontaneously emitted radiation emerging from the laser device into a light-guide device, it being preferred if the light-guide device is simultaneously also used for supplying pumped light to the laser device. This configuration advantageously requires no separate optical channel for transmitting the optical information used for the diagnosis according to the present invention.

The optical coupling means according to the present invention may advantageously also include at least one reflector for reflecting spontaneously emitted radiation emerging from the laser device to a light-guide device or to a detector or the like. In an especially advantageous manner, the reflector may be formed by a correspondingly coated inner surface of a housing accommodating the laser device, so that a very stable system results which simultaneously has small dimensions, in which the optical coupling means are advantageously developed together with the laser device or its housing in a virtually integral manner.

As an alternative to a lateral out-coupling of the spontaneously emitted radiation from the laser device, the spontaneously emitted radiation may also be at least partially out-coupled from the laser device according to the present invention by way of a surface on the end face. For this purpose, the optical coupling means according to the present invention are at least partially realized by a region of the front-side surface of the laser device, in particular the laser-active solid-state body, that does not simultaneously constitute a coupling mirror for the pumped light, so that the spontaneously emitted radiation is able to emerge from the laser device at the front end as well. This configuration according to the present invention advantageously requires particularly small radial dimensions of the laser device.

In another very advantageous development of the method according to the present invention, which permits an especially precise evaluation of an operating state of the laser device, an evaluation device for evaluating the spontaneously emitted radiation is synchronized with the test pulse in such a way that a measuring interval at least partially coincides with an expected spontaneous emission. This method variant of the present invention advantageously allows for a reliable evaluation of the spontaneously emitted radiation without simultaneously requiring filtering of the particular wavelength of the spontaneously emitted radiation. A saturation of a photo detector included in the evaluation device is also advantageously able to be avoided in this manner. The synchronization according to the present invention may be performed in that, for example, the expected instant of spontaneous emissions is specified based on knowledge of the used laser-active material of the laser device and a corresponding time constant for the spontaneous emission.

In an especially advantageous manner, the present invention may also provide for the start of the measuring period to approximately coincide with the end of the test pulse, which advantageously ensures that a maximum radiation intensity of the spontaneously emitted radiation is provided at the beginning of the measuring period as a result of the excitation by the test pulse that has since taken place. In this method variant, in particular, a light-guide device supplying the test pulse is also able to be used for transmitting the spontaneously emitted radiation to an evaluation unit, since the measuring period does not overlap with the output of the test pulse.

According to the present invention, amplitude measuring windows for the intensity of the spontaneously emitted radiation to be evaluated are advantageously able to be specified as a function of the optical configuration of the laser device according to the present invention, in particular the damping of various components used for realizing the optical link between the pumped light source and the laser device. Depending on the agreement between an actually occurring intensity of the spontaneously emitted radiation determined by a photo detector, for instance, and one of the specified amplitude measuring windows, it is advantageously possible to infer a specific error type or, in general, an operating state of the optical link between the pumped light source and the laser device. If the evaluation unit is situated at the location of the pumped light source, for example, then the evaluation of the spontaneously emitted radiation according to the present invention allows a conclusion to the effect that a plug-in connection between a light-guide device and the laser device is defective, and/or that no optical fiber device or no optical link between the pumped light source and the laser device exists at all, and/or that a fracture of an optical fiber of the optical link has occurred, and/or that a plug-in connection between a light-guide device of the optical link and the pumped light source is defective, and/or that the introduction of pumped light or the test pulse into the laser device is faulty.

In one further very advantageous variant of the present invention, an application of pumped light is deactivated and/or a fault reaction initiated if an adverse effect on the integrity of the optical link between the laser device and the pumped light source has been detected.

For example, the fault reaction may include the creation of an entry in the fault memory in a control device controlling the laser device.

The principle according to the present invention does not require the pumped light source and the means for generating the test pulse to be placed together or to be identical. Instead, it is also conceivable to integrate means for generating a test pulse such as, for example, a light diode or the like in the laser device itself or in the optical coupling means used for the optical coupling between an optical link extending between the pumped light source and the laser device. A corresponding detector may also be provided at different installation locations. In addition to the detection of the spontaneous emissions produced by the test pulse, direct monitoring of the transmission of the test pulse via an optical link is possible as well.

As an additional attainment of the object of the present invention, a laser device is provided as recited in claim 13.

In one especially advantageous variant of the laser device according to the present invention the optical coupling means are at least partially formed by a light-conducting end section of a light-guide device supplying the pumped light, which end section preferably has a sleeve-shaped design and at least partially surrounds an end region of the laser device lying opposite.

Further advantageous developments of the laser device according to the present invention are the subject matter of the dependent claims.

The laser device according to the present invention is particularly suitable for use in a laser-based ignition device of an internal combustion engine of a motor vehicle or also a stationary engine.

Additional features, application options and advantages of the present invention ensue from the following description of exemplary embodiments of the present invention, which are illustrated in the figures of the drawing. All of the described or illustrated features form the subject matter of the present invention, individually or in any combination, regardless of their combination in the patent claims or their antecedent reference, and also regardless of their formulation or illustration in the description or in the drawing.

BRIEF DESCRIPTION OF THE SEVERAL VIEWS OF THE DRAWINGS

FIG. 6 shows a simplified flow chart of a specific embodiment of the operating method according to the present invention.

DETAILED DESCRIPTION OF THE INVENTION

Figure 1:
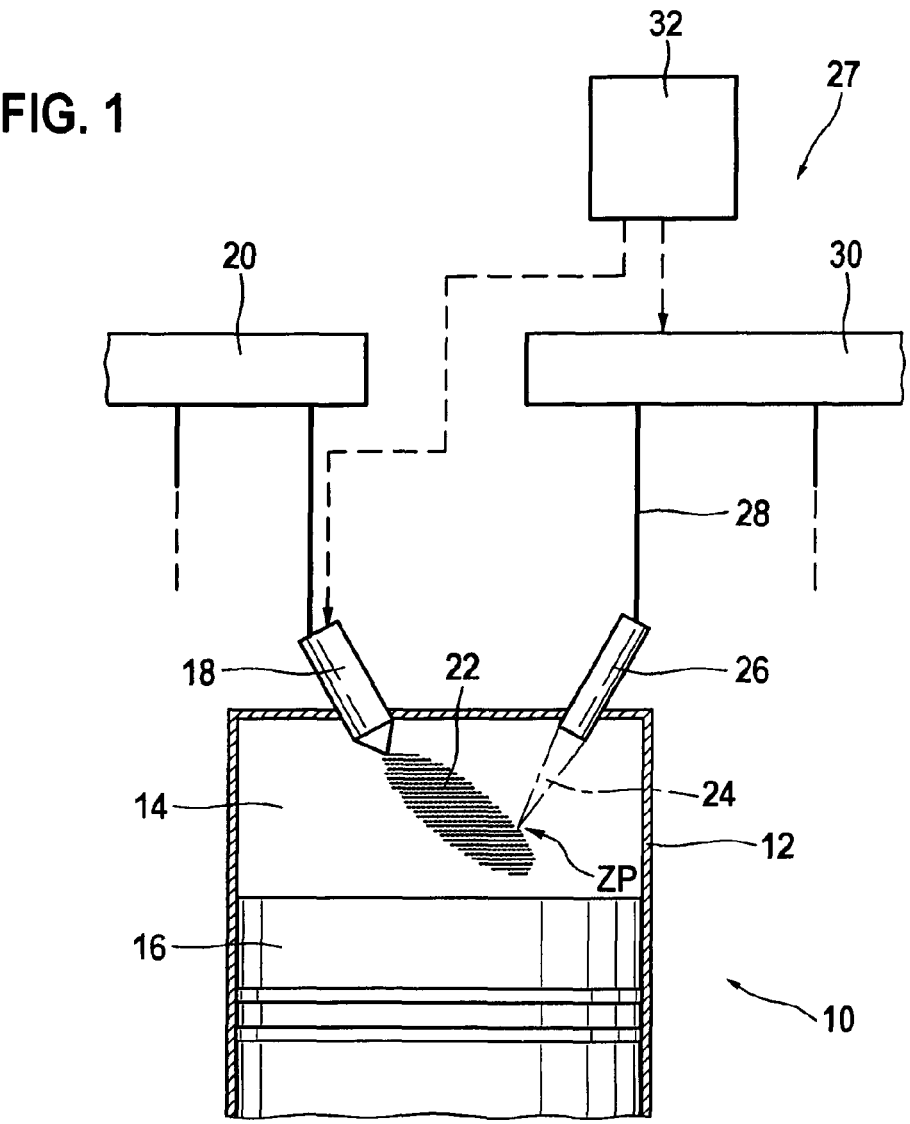
FIG. 1 shows a schematic illustration of an internal combustion engine having an ignition device according to the present invention.

In FIG. 1, an entire internal combustion engine is denoted by reference numeral 10. It is used for driving a motor vehicle that is not shown. Internal combustion engine 10 includes a plurality of cylinders, of which only one, having reference numeral 12, is shown in FIG. 1. A combustion chamber 14 of cylinder 12 is bounded by a piston 16. Fuel reaches combustion chamber 14 directly through an injector 18, which is connected to a fuel pressure reservoir 20 which is also referred to as a rail. The internal combustion engine may also be operated as naturally aspirated engine. In that case the fuel is injected into the intake manifold or blown in and aspirated into the cylinder. Following compression, ignition device 27 ignites the mixture at the ignition instant at the ignition point.

Fuel 22 injected into combustion chamber 14 is ignited using a laser beam 24, which is preferably eradiated into combustion chamber 14 in the form of a laser pulse, by an ignition device 27 which includes a laser device 26. For this purpose, laser device 26 is fed, via a light-guide device 28, with pumped light provided by a pumped light source 30. Pumped light source 30 is controlled by a control device 32, which also triggers injector 18.

Figure 2:
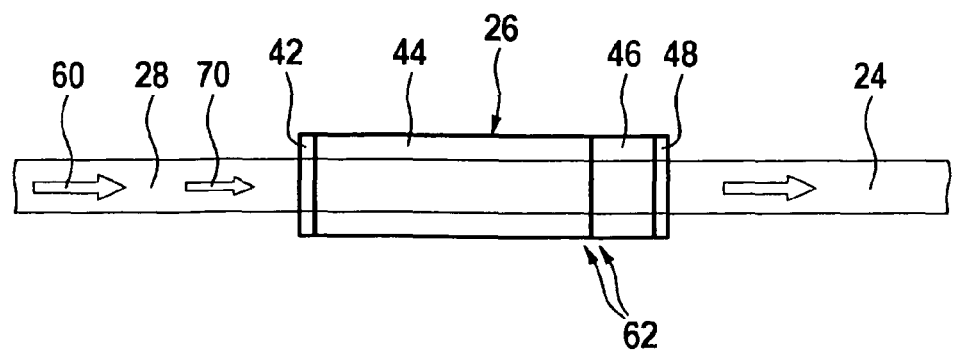
FIG. 2 shows a schematic representation of the ignition device in FIG. 1.

A detailed representation of laser device 26 is shown in FIG. 2. Laser device 26 has a laser-active solid-state body 44 as well as a passive Q-switch 46, which in conjunction with a coupling mirror 42 and an output coupler 48 forms a laser oscillator. On the output side, i.e., to the right of output coupler 48 in FIG. 2, focusing optics (not shown here) may be provided, which is used for focusing a laser beam 24 or laser pulse generated by laser device 26 on an ignition point ZP schematically shown in FIG. 1, which is situated inside combustion chamber 14 of internal combustion engine 10.

The basic method of functioning of laser device 26 is as follows: Pumped light 60, which is supplied to laser device 26 via light-guide device 28, enters laser-active solid-state body 44 through coupling mirror 42 which is transparent for a wavelength of pumped light 60. Pumped light 60 is absorbed there, which leads to a population inversion. The initially high transmission losses of passive Q-switch 46 prevent a laser oscillation inside laser device 26 in the beginning. However, with increasing pumping duration, the radiation density also rises in the interior of resonator 62 formed by laser-active solid-state body 44 and passive Q-switch 46 as well as mirrors 42, 48. Beginning at a certain radiation density, passive Q-switch 46 or a saturable absorber of passive Q-switch 46 fades out, so that a laser oscillation comes about in resonator 62.

Because of this mechanism which is known per se, a laser beam 24 in the form of a giant pulse is generated, which passes through output coupler 48 and is focused on ignition point ZP located inside combustion chamber 14 by possibly provided focusing optics.

According to the present invention, an optical test pulse is applied to laser device 26 in order to check the integrity of the optical link between laser device 26 and pumped light source 30 (FIG. 1). In the just described specific embodiment of laser device 26 according to the present invention, the optical link is essentially formed by light-guide device 28.

In an especially advantageous manner, it may be provided that the test pulse, as symbolized by block arrow 70 in FIG. 2, is generated by pumped light source 30 supplying pumped light 60, which results in an especially small-dimensioned and cost-effective configuration of ignition device 27 according to the present invention.

Figure 3A:
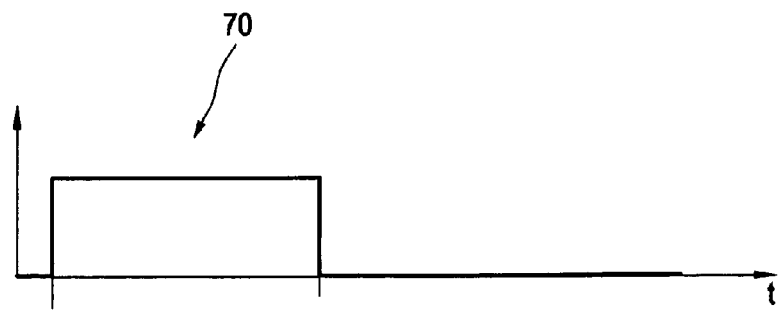
FIGS. 3a-3c show a time characteristic of various performance quantities of the laser device according to the present invention.

FIG. 3a shows an exemplary time characteristic of the amplitude of an intensity of optical test pulse 70, which is output by pumped light source 30 between instants t0, t1 (FIG. 3c) and is transmitted to laser device 26 analogous to pumped light 60 via light-guide device 28.

Figure 3B:
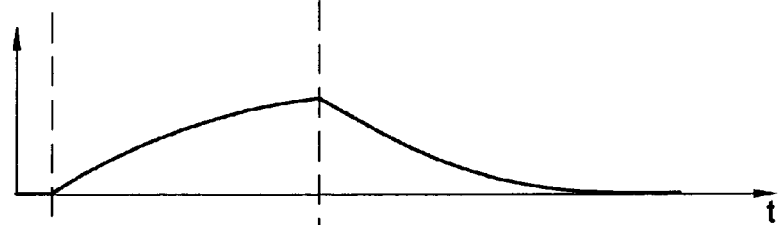

FIG. 3b shows the resulting time characteristic of the intensity of spontaneously emitted radiation as it is produced in laser device 26 when test pulse 70 is applied.

According to the present invention, this spontaneously emitted radiation or its time characteristic is analyzed in order to infer an operating state of ignition device 27. For example, laser device 26 according to the present invention may be assigned a suitable evaluation device for this purpose, which includes, in particular, a photo detector such as a photo diode, for example, to which the spontaneously transmitted radiation is forwarded and which then converts it into a corresponding electrical signal, which is able to be analyzed by control device 32 (FIG. 1), for instance.

Figure 3C:
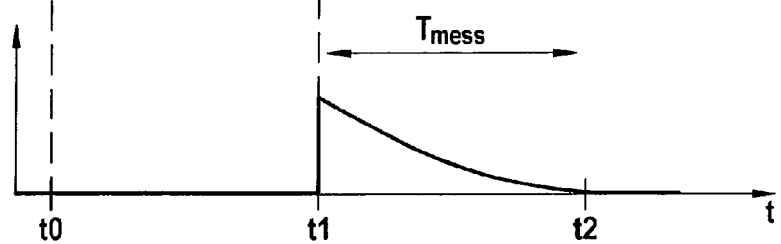

The electrical signal obtained from the photo diode is shown in FIG. 3c by way of example.

According to the present invention, the application of test pulse 70 to laser device 26 advantageously takes place periodically, especially prior to each generation of a regular laser pulse 24, which results in especially high operating safety of laser device 26 according to the present invention.

Figure 4:
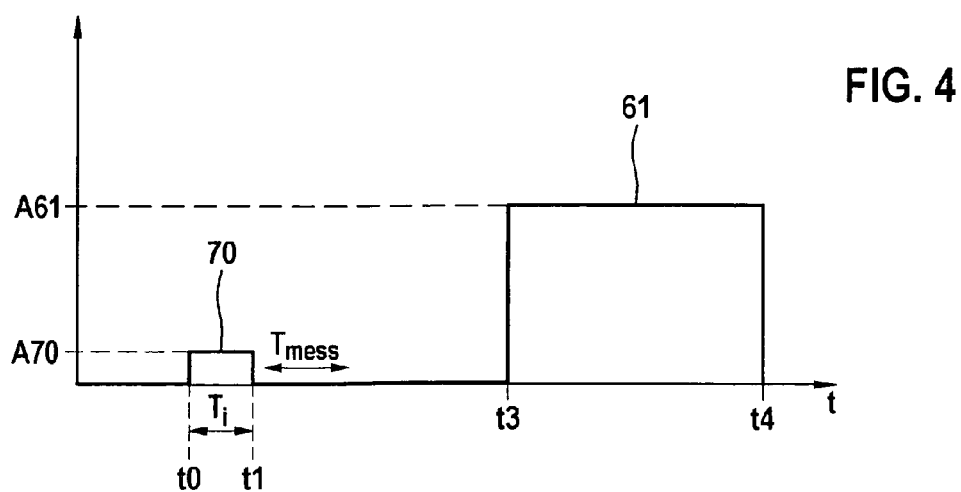
FIG. 4 shows a time characteristic of the amplitude of a test pulse according to the present invention, in relation to a pumped light pulse.

FIG. 4, by way of example, shows the time characteristic of an amplitude A70 of test pulse 70 according to the present invention in relation to subsequent pumped light pulse 61.

As can be gathered from FIG. 4, test pulse 70 according to the present invention extends between instants t0 and t1, whereby pulse width Ti=t1−t0 is defined. The recording according to the present invention of the intensity of the spontaneously emitted radiation produced in response to the application of test pulse 70 is advantageously synchronized with the generation of test pulse 70, in such a way that a corresponding measuring period Tmess directly follows the generation of test pulse 70. That means that measuring period Tmess examined here extends from instant t1 up to an instant t2 (not denoted in greater detail in FIG. 4), cf. also FIG. 3c. Due to this fenestration in measuring the spontaneously emitted radiation, the electrical signal shown in FIG. 3c and received from the photo diode has no non-zero values for the time period t<t1 in this case. The fenestration advantageously avoids an undesired saturation of the photo diode, which otherwise may result in such configurations in which test pulse 70 and the spontaneous emissions to be analyzed are transmitted via the same light-guide device 28.

Instant t2 may be specified on the basis of knowledge of used laser-active material 44 of laser device 26 and a corresponding time constant for the spontaneous emission.

In the present invention, the generation of pumped light pulse 61, if appropriate, takes place only at a later instant t3, up to instant t4, which, as already described, is provided to generate a population inversion in laser device 26 and thus to generate laser pulse 24.

The time characteristic of pulses 70, 61 according to FIG. 4 also shows that amplitude A70 of the intensity of test pulse 70 is considerably lower than amplitude A61 of pumped light pulse 61. This is advantageously provided according to the present invention in order to avoid harm to people such as service technicians engaged in servicing laser device 26, or damage to components of laser device 26 or pumped light source 30 itself, if the integrity of an optical link 28 of laser device 26 carrying test pulse 70 should no longer be ensured as a result of damage.

In particular, pulse duration Ti and/or amplitude A70 and/or the pulse energy of test pulse 70 may be selected in such a way that specifiable limit values will not be exceeded. These limit values may advantageously be selected based on existing limit values established by official institutions or the like.

FIG. 6 shows a simplified flow chart of a specific embodiment of the operating method according to the present invention. In a first step 100, test pulse 70 according to the present invention is applied to laser device 26, which pulse is advantageously likewise generated by pumped light source 30 (FIG. 1), as described earlier already.

In a subsequent step 110, the spontaneously emitted radiation of laser device 26 generated in response to the application of test pulse 70 is analyzed according to the present invention and the integrity of optical link 28 between laser device 26 and pumped light source 30 is inferred therefrom. In following step 120, a corresponding evaluation result is checked with regard to agreement with specifiable setpoint values. If check 120 allows proper operation of laser device 26 to be inferred, regular laser pulse 24 is subsequently generated in step 130 in that pumped light pulse 61 (FIG. 4) is applied to laser device 26 for a specifiable period of time.

However, if the check according to the present invention, cf. step 120, has shown that the integrity of optical link 28 between pumped light source 30 (FIG. 1) and laser device 26 does not exist or no longer exists, then no pumped light 60 will be applied to laser device 26 according to the present invention in order to avoid the radiation of possibly defective components of laser device 26 by the high-energy pumped light pulse 61. Instead, an entry may be written into a fault memory of control device 32, for example.

Figure 5A:
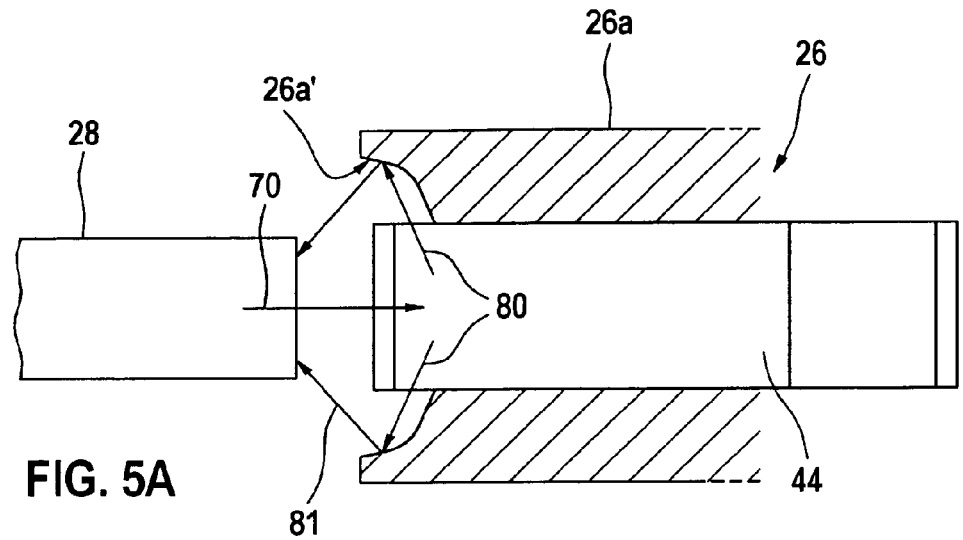
FIGS. 5a-5d show additional specific embodiments of the laser device according to the present invention.

FIG. 5a shows another specific embodiment of laser device 26 according to the present invention, in which optical coupling means are provided for inputting spontaneously emitted radiation 80 from laser-active solid-state body 44 into light-guide device 28. According to the present invention, the optical coupling means are advantageously implemented in the form of reflector surface 26a', which is disposed in the region of a recess of housing 26a accommodating laser device 26, as can be gathered from FIG. 5a. According to the present invention, the geometry of reflector surface 26a' has been selected such that the most efficient reflection of spontaneously emitted radiation 80 possible into light-guide device 28 is able to take place.

The beam paths of spontaneously emitted radiation 80 evaluated according to the present invention are illustrated by way of example by corresponding arrows 80, 81 in FIG. 5a.

Figure 5B:
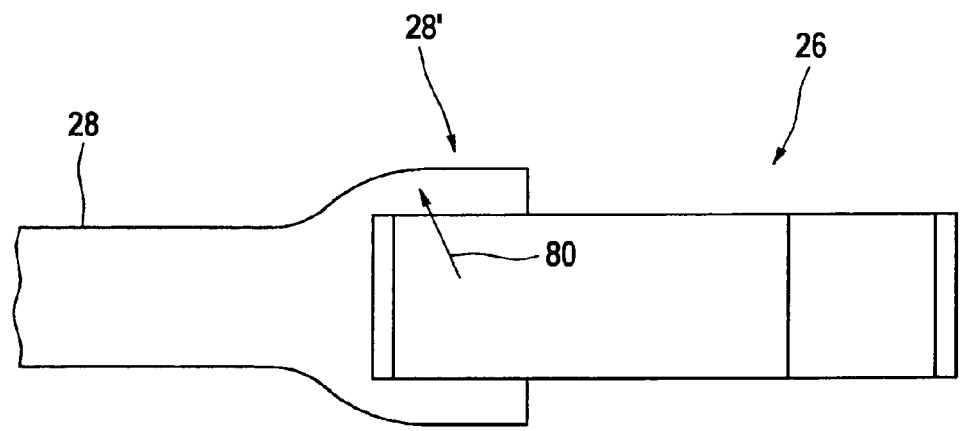

In another very advantageous specific embodiment of laser device 26 according to the present invention, which is shown in FIG. 5b, the optical coupling means are at least partially formed by a light-conducting end section 28' of light-guide device 28 supplying pumped light 60. As can be gathered from FIG. 5b, end section 28' preferably has a sleeve-type design and at least partially encloses an opposite-lying end region of laser device 26 in order to allow for an efficient in-coupling of spontaneously emitted radiation 80 into light-guide device 28.

In one further very advantageous development of laser device 26 according to the present invention, the optical coupling means are at least partially formed by a region 44a of an end-face surface (FIG. 5c) of laser device 26, in particular of laser-active solid-state body 44, that does not simultaneously constitute a coupling mirror 42 for pumped light 60. This advantageously provides the possibility of coupling not only pumped light 60 but also spontaneously emitted radiation 80 longitudinally into laser device 26 or out of it.

Figure 5C:
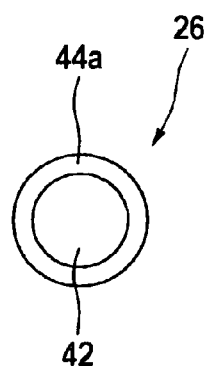

In the plan view according to FIG. 5c, the end face surface of laser-active solid-state body 44 not taken up by coupling mirror 42 has been denoted by reference numeral 44a. As can be gathered from FIG. 5c, it has a circular area that surrounds coupling mirror 42 concentrically.

Figure 5D:
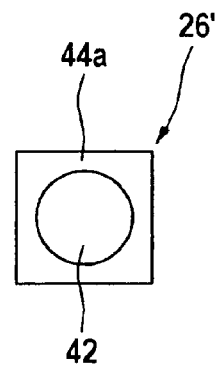

Another specific embodiment 26' of the laser device according to the present invention is illustrated in FIG. 5d. In contrast to the specific embodiment of laser device 26 described with reference to FIG. 5c, laser device 26' according to FIG. 5d has a square cross-section, while coupling mirror 42 forms a circular area, as before.

Both variants allow for the efficient and space-conserving out-coupling of spontaneously emitted radiation 80 from laser device 26 into light-guide device 28.

According to the present invention, amplitude measuring windows for the intensity of spontaneously emitted radiation 80 to be evaluated are advantageously able to be specified as a function of the optical configuration of laser device 26 according to the present invention, in particular the damping of various components used for realizing optical link 28 between pumped light source 30 and laser device 26. Depending on the agreement of an actually occurring intensity of spontaneously emitted radiation 80 determined by a photo detector, for instance, and one of the specified amplitude measuring windows, it is advantageously possible to infer a specific error type or, in general, an operating state of optical link 28 between pumped light source 30 and laser device 26.

If the evaluation unit is situated at the location of pumped light source 30, for example, then the evaluation of spontaneously emitted radiation 80 according to the present invention makes it possible to conclude that a plug-in connection between a light-guide device 28 and laser device 26 is defective, and/or that no light-guide device 28 or no optical link exists at all between pumped light source 30 and laser device 26, and/or that an optical fiber of the optical connection has fractured, and/or that a plug-in connection between a light-guide device 28 of the optical link and pumped light source 30 is defective, and/or that the introduction of pumped light 60 or test pulse 70 into the laser device is faulty.

For example, such faults may be inferred from a drop of an actually detected intensity of spontaneously emitted radiation 80 in comparison with a reference value determined in a properly functioning new system, for instance.

The principle according to the present invention may generally also be applied to laser devices used in ignition devices for stationary engines, or also to other laser devices in which the function check using the test pulse according to the present invention is able to be performed prior to the application of pumped light pulses.

What is claimed is:

1. A method for operating a laser device, which has a laser-active solid-state body including a passive Q switch, comprising: applying pumped light to the laser device in order to generate a laser pulse, wherein at least one of the laser device and an optical link between the laser device and a pumped light source supplying the pumped light is at least partially acted upon by an optical test pulse in order to check the integrity of the optical link between the laser device and the pumped light source supplying the pumped light;

wherein the test pulse is applied to the laser device, and spontaneously emitted radiation produced in the laser device in response to the test pulse is evaluated;

wherein the spontaneously emitted radiation produced in response to the test pulse is transmitted from the laser device to an evaluation device via optical coupling means;

wherein the coupling means reflect spontaneously emitted radiation emerging from the laser device into a light-guide device, which is also used for supplying pumped light to the laser device.

2. The method as recited in claim 1, wherein characteristic properties of the test pulse, including its pulse duration (Ti), amplitude (A70) and pulse energy, are selected in such a way that they do not exceed specifiable limit values, the limit values being selected such that no danger to operating personnel exposed to the test pulse emanates from the test pulse.

3. The method as recited in claim 1, wherein the test pulse is generated by the pumped light source providing the pumped light.

4. The method as recited in claim 1, wherein test pulses are emitted periodically, prior to each generation of a laser pulse.

5. The method as recited in claim 1, wherein the spontaneously emitted radiation is coupled out of the laser device at least partially via an end-face surface.

6. The method as recited in claim 1, wherein an application of pumped light is deactivated or a fault reaction is initiated if an adverse effect on the integrity of the optical link between the laser device and the pumped light source has been detected.

7. A method for operating a laser device, which has a laser-active solid-state body including a passive Q switch, comprising: applying pumped light to the laser device in order to generate a laser pulse, wherein at least one of the laser device and an optical link between the laser device and a pumped light source supplying the pumped light is at least partially acted upon by an optical test pulse in order to check the integrity of the optical link between the laser device and the pumped light source supplying the pumped light;

wherein the test pulse is applied to the laser device, and spontaneously emitted radiation produced in the laser device in response to the test pulse is evaluated; and wherein an evaluation device for evaluating the spontaneously emitted radiation is synchronized with the test pulse in such a way that a measuring period (Tmess) at least partially coincides with an expected spontaneous emission.

8. The method as recited in claim 7, wherein the beginning (t1) of the measuring period (Tmess) approximately coincides with the end of the test pulse.

9. A method for operating a laser device, which has a laser-active solid-state body including a passive Q switch, comprising: applying pumped light to the laser device in order to generate a laser pulse, wherein at least one of the laser device and an optical link between the laser device and a pumped light source supplying the pumped light is at least partially acted upon by an optical test pulse in order to check the integrity of the optical link between the laser device and the pumped light source supplying the pumped light;

wherein the test pulse is applied to the laser device, and spontaneously emitted radiation produced in the laser device in response to the test pulse is evaluated; and wherein amplitude measuring windows are specified for the intensity of the spontaneously emitted radiation to be evaluated, and an operating state of the optical link between the laser device and the pumped light source is inferred as a function of the agreement between an actually occurring intensity and one of the amplitude measuring windows.

10. A laser device comprising: a laser-active solid-state body having a passive Q switch, and having an optical link including a light-guide device via which pumped light generated by a pumped light source is able to be supplied to the laser device in order to generate a laser pulse, and means for generating an optical test pulse for at least partial application to at least one of the laser device and the optical link between the laser device and the pumped light source supplying the pumped light; and optical coupling means for transmitting spontaneously emitted radiation produced in response to the test pulse from the laser device to an evaluation device;

wherein the optical coupling means have at least one reflector in order to conduct spontaneously emitted radiation emerging from the laser device into the light-guide device of the optical link.

11. The laser device as recited in claim 10, wherein the means for generating the test pulse are integrated in the pumped light source or are formed by the pumped light source.

12. The laser device as recited in claim 10, wherein the optical coupling means are at least partially formed by a region of an end-face surface of the laser-active solid-state body that does not simultaneously constitute a coupling mirror for the pumped light.

13. An ignition device for an internal combustion engine of a motor vehicle, having at least one laser device as recited in claim 10.

14. A laser device comprising: a laser-active solid-state body having a passive Q switch, and having an optical link including a light-guide device via which pumped light generated by a pumped light source is able to be supplied to the laser device in order to generate a laser pulse, and means for generating an optical test pulse for at least partial application to at least one of the laser device and the optical link between the laser device and the pumped light source supplying the pumped light; and optical coupling means for transmitting spontaneously emitted radiation produced in response to the test pulse from the laser device to an evaluation device;

wherein the optical coupling means are at least partially formed by a light-conducting end section of the light-guide device supplying the pumped light, which has a sleeve-type design and at least partially encloses an opposite-lying end region of the laser device.

* * * * *